United States Patent
Parker et al.

(10) Patent No.: US 9,866,149 B2
(45) Date of Patent: Jan. 9, 2018

(54) METHOD AND APPARATUS FOR ENABLING FLOATING TOUCH SCREEN HAPTICS ASSEMBLIES

(71) Applicant: Immersion Corporation, San Jose, CA (US)

(72) Inventors: Daniel Parker, San Jose, CA (US); Kohei Imoto, Cupertino, CA (US); Elena Redelsheimer, Milpitas, CA (US); Aaron Kapelus, Jamaica Plain, MA (US); Michael Greenish, Gryon (CH)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 14/802,795

(22) Filed: Jul. 17, 2015

(65) Prior Publication Data

US 2016/0027263 A1  Jan. 28, 2016

Related U.S. Application Data

(60) Provisional application No. 62/029,939, filed on Jul. 28, 2014, provisional application No. 62/107,765, filed on Jan. 26, 2015.

(51) Int. Cl.
*H04B 3/36* (2006.01)
*H02N 2/04* (2006.01)
*G06F 3/01* (2006.01)

(52) U.S. Cl.
CPC .............. *H02N 2/043* (2013.01); *G06F 3/016* (2013.01)

(58) Field of Classification Search
CPC .... B41J 29/38; B41J 2/04541; B41J 2/04581; B41J 2/0459; B41J 2/04598;
(Continued)

(56) References Cited

U.S. PATENT DOCUMENTS 6,289,783 B1 * 9/2001 Sagaser ................. E02F 9/2004
                                                    74/481
6,294,859 B1   9/2001 Jaenker
(Continued)

FOREIGN PATENT DOCUMENTS

| GB | 2492968 | 1/2013 |
| WO | 99/17850 A2 | 4/1999 |
| WO | 2014/078902 A1 | 5/2014 |

OTHER PUBLICATIONS

Extended European Search Report, EP Application No. 15 178 589.6, dated Dec. 11, 2015.
(Continued)

*Primary Examiner* — Daniel Previl
(74) *Attorney, Agent, or Firm* — Medler Ferro Woodhouse & Mills PLLC

(57) ABSTRACT

A system that includes an actuator amplification apparatus and a push pull actuator disposed on or within the actuator amplification apparatus. The actuator amplification apparatus is configured to receive a push pull actuator. The actuator amplification apparatus includes a body fixture configured to attach the actuator amplification apparatus to a fixed mass, an output interface to attach the actuator amplification apparatus to a moving mass, and an integral amplification mechanism. The integral amplification mechanism of the actuator amplification apparatus amplifies a force output by the push pull actuator to the moving mass. The integral amplification mechanism includes a plurality of linkages or an integral lever arm. The actuator amplification apparatus may include stabilizers configured to limit movement of the push pull actuator. In an embodiment, the fixed mass is a dashboard frame of an automobile and the moving mass is a floating haptic touch screen assembly.

20 Claims, 4 Drawing Sheets

(58) Field of Classification Search
CPC ...... B41J 2/04593; B25J 13/025; F15B 1/021; F15B 2201/21; F15B 2201/305; F15B 2201/4053; F15B 2201/413; F15B 3/00; F15B 7/00
USPC ......... 340/407.1, 407.2, 566, 571, 648, 660, 340/679–680, 683, 691.7, 825.23, 7.6
See application file for complete search history.

(56) References Cited

U.S. PATENT DOCUMENTS

| | | | |
|---|---|---|---|
| 6,563,487 B2 | 5/2003 | Martin et al. | |
| 7,182,691 B1* | 2/2007 | Schena | A63F 13/06 345/161 |
| 7,283,120 B2 | 10/2007 | Grant | |
| 7,973,769 B2* | 7/2011 | Olien | G06F 3/016 345/156 |
| 8,506,369 B2 | 8/2013 | Grant | |
| 8,508,486 B2 | 8/2013 | Grant et al. | |
| 8,545,323 B2 | 10/2013 | Mcvicar | |
| 2002/0054011 A1* | 5/2002 | Bruneau | A63F 13/06 345/156 |
| 2002/0133174 A1* | 9/2002 | Charles | A61B 34/30 606/130 |
| 2003/0109314 A1 | 6/2003 | Ku | |
| 2004/0137983 A1 | 7/2004 | Kerr | |
| 2005/0231476 A1 | 10/2005 | Armstrong | |
| 2007/0247031 A1 | 10/2007 | Petersen | |
| 2009/0085882 A1 | 4/2009 | Grant et al. | |
| 2009/0115292 A1 | 5/2009 | Ueda et al. | |
| 2010/0320870 A1 | 12/2010 | Rahman et al. | |
| 2013/0147610 A1 | 6/2013 | Grant | |
| 2013/0194085 A1 | 8/2013 | Grant et al. | |
| 2014/0315642 A1* | 10/2014 | Grant | A63F 13/06 463/38 |
| 2015/0018101 A1 | 1/2015 | Schoenith et al. | |
| 2015/0133221 A1* | 5/2015 | Danny | A63F 13/92 463/37 |
| 2016/0256148 A1* | 9/2016 | Huffmaster | A61B 17/025 |

OTHER PUBLICATIONS

Non-Final Office Action for U.S. Appl. No. 14/258,644, dated Aug. 26, 2016.
Notice of Allowance for U.S. Appl. No. 14/258,644, dated May 30, 2017.
Non-Final Office Action for U.S. Appl. No. 15/685,107, dated Sep. 28, 2017.

* cited by examiner

METHOD AND APPARATUS FOR ENABLING FLOATING TOUCH SCREEN HAPTICS ASSEMBLIES

CROSS-REFERENCE TO RELATED APPLICATIONS

This application claims the benefit of U.S. Provisional Patent Application Ser. No. 62/029,939, filed Jul. 28, 2014, which is hereby incorporated by reference in its entirety for all purposes. This application also claims the benefit of U.S. Provisional Patent Application Ser. No. 62/107,765, filed Jan. 26, 2015, which is hereby incorporated by reference in its entirety for all purposes.

FIELD OF THE INVENTION

Embodiments hereof are directed generally to actuators for floating touch screen haptic assemblies and more particularly, to a method and apparatus for actuator amplification to enable haptics on a heavy floating touch screen assembly.

BACKGROUND OF THE INVENTION

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, touchpad devices and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, touch pad, lever, joystick wheel, or some other control, the OS of the device can send a play command through control circuitry to the embedded hardware. The embedded hardware then produces the appropriate haptic effect.

In an automotive environment, haptics can provide tactile feedback to help create a more confident and safe user experience in an automotive environment. Automotive applications of haptics have included rotary knobs, joysticks, touch pads and touch screens. The use of touchscreens in the automotive environment is increasing. Touchscreens are a natural interface for navigation systems, and tactile feedback is an excellent complement-improving the overall touchscreen usability as well as specific features of the navigation system human-machine interface. Users experience more intuitive interactions, reduced glance time for improved safety, and space-saving designs. The touchscreen buttons deliver a tactile pulse the user can actually feel through the screen, since the screen is mounted on a suspension that permits movement of the screen, allowing the user to select an icon with a quick glance and touch of the screen. Furthermore, with the use of proximity—sensing technology, a hand can be detected as it approaches the touch screen. When the icon is pressed, the screen pulses to acknowledge the command, allowing one to keep their eyes safely on the road. Thus the physical feedback of a haptic touch screen or touch pad allows the driver to operate the system without looking at the screen or pad. The Cadillac CUR and the Acura RLX On-Demand Multi-Use Display™ are two automotive haptic touch screen applications. The Lexus NX utilizes a haptic touch pad application.

The touch screens used in the automotive environment are large displays and can be heavier than other haptic touch screens. For example, a 10-inch display may be desired and can weigh around 500 g (heavy) since the system may include a LCD secured to the touch panel by optical bonding for better visibility. The touch screen or panel may be referred to as a floating screen, as it is mounted on a suspension system to allow the screen to move as the haptic effects are generated. To provide haptics to a floating system device, low travel (motion) and high force (for acceleration) is require. As moving masses, such as the screen and its assembly, become larger and/or heavier (100 grams to 2 Kilograms), the force required rises above what cost effective push pull solenoids can provide.

Currently there are no cost effective solutions to provide haptics when the moving mass of the touch screen or panel is greater than 300 grams. The accepted approach is to use multiple solenoid or piezoelectric actuators. A touch screen panel with a moving mass is also a complex design as it is dependent on the operation of multiple components working together to create the haptic effect.

Embodiments hereof relate to an amplification mechanism for a single actuator, such as an inexpensive push pull solenoid actuator, in order to enable haptics on larger or heavier form factors and the moving mass sizes can range from 200 gram to 2 Kgram. Using a single actuator with an amplification mechanism instead of using multiple actuators results in a cost effective and less complicated design.

BRIEF SUMMARY OF THE INVENTION

Embodiments hereof relate to a system that includes an actuator amplification apparatus and a push pull actuator disposed on or within the actuator amplification apparatus. The actuator amplification apparatus is configured to receive a push pull actuator. The actuator amplification apparatus includes a body fixture configured to attach the actuator amplification apparatus to a fixed mass, an output interface to attach the actuator amplification apparatus to a moving mass, and an integral amplification mechanism. The integral amplification mechanism of the actuator amplification apparatus amplifies a force output by the push pull actuator to the moving mass.

Embodiments hereof relate to a system that an amplification frame. The amplification frame includes a body fixture configured to connect the amplification frame to a fixed mass, an output interface to connect the amplification frame to a moving mass, an actuator receiving sleeve configured to receive a push pull actuator, and a plurality of linkages. The plurality of linkages include a first pair of opposing linkages extending between the actuator mount and the body fixture and a second pair of opposing linkages extending between the actuator mount and the output interface. Each linkage of the first pair of opposing linkages is attached to the actuator mount and the body fixture by a pair of flexible joints and each linkage of the second pair of opposing linkages is attached to the actuator mount and the output interface by a pair of flexible joints. A push pull actuator is disposed within the actuator receiving sleeve and configured to output a force. Each flexible joint of the amplification frame is configured to transmit torque output by the push pull actuator through the amplification frame. The plurality of linkages of the amplification frame amplifies the force output by the push pull actuator to the moving mass.

Embodiments hereof relate to a system that includes an actuator amplification apparatus. The actuator amplification apparatus includes an actuator mount is configured to receive a push pull actuator and is configured to attach the actuator amplification apparatus to a fixed mass. The actuator amplification apparatus also includes an output interface to attach the actuator amplification apparatus to a moving mass and a lever arm system extending between the actuator mount and the output interface. The lever arm system is attached to the actuator mount and the output interface by a plurality of flexible joints. A push pull actuator is disposed within the actuator mount and configured to output a force. Each flexible joint of the actuator amplification apparatus is configured to transmit torque output by the push pull actuator through the lever arm system. The lever arm system amplifies the force output by the push pull actuator to the moving mass.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is primarily directed to an actuator amplification apparatus for use with heavy floating touch screen assemblies, those skilled in the art would recognize that the description applies equally to other moving masses.

Embodiments hereof relate to a system that includes an actuator amplification apparatus and a push pull actuator disposed on or within the actuator amplification apparatus. The actuator amplification apparatus is configured to receive a push pull actuator. The actuator amplification apparatus is configured to attach to a fixed mass and to a moving mass, and the actuator amplification apparatus includes an integral amplification mechanism. The integral amplification mechanism of the actuator amplification apparatus amplifies a force output by the push pull actuator to the moving mass. The actuator amplification apparatus amplifies the force by a ratio between 2:1 and 5:1. Thus, the present invention requires a single actuator, such as an inexpensive push pull solenoid actuator, and the integral amplification mechanism enables haptics on larger or heavier form factors and the moving mass sizes can range from 200 gram to 2 Kgram. However, although described as being utilized with a single push pull actuator, it will be understood by one of ordinary skill in the art that integral amplification mechanisms described herein may be used with multiple actuators depending upon the desired or requisite output force of the system.

Figure 1:
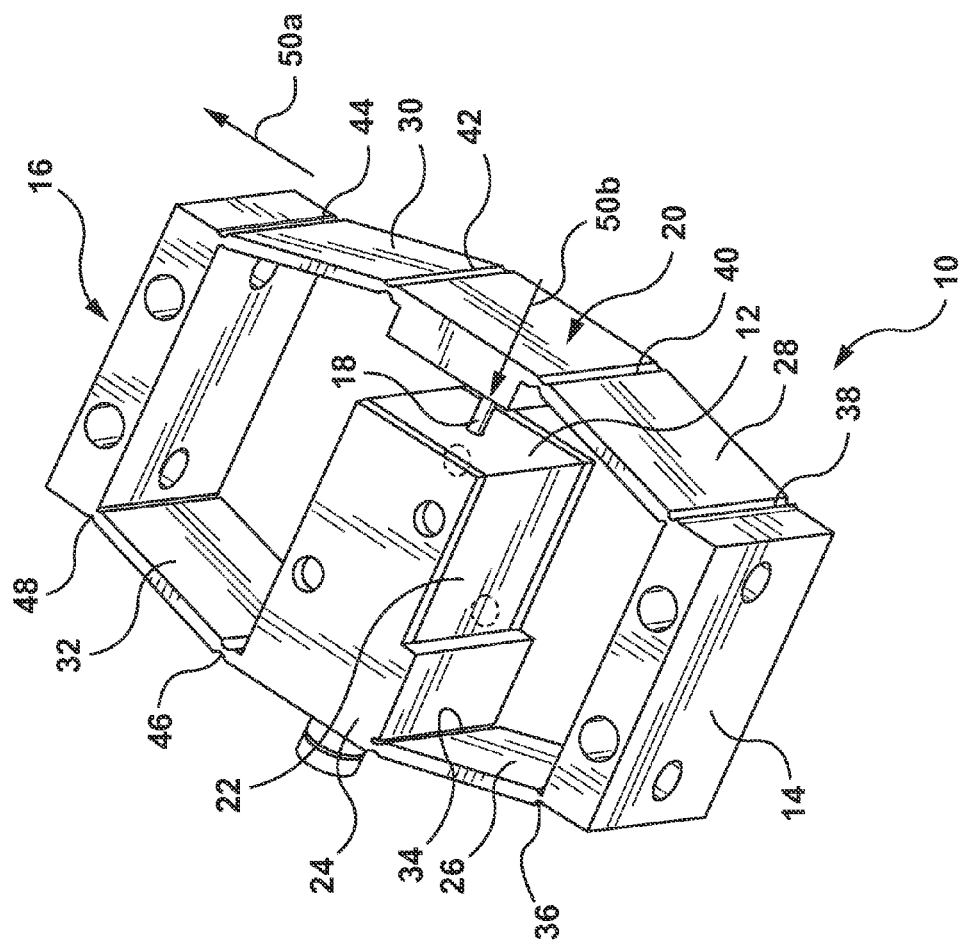
FIG. 1 is a perspective view of an actuator amplification apparatus according to an embodiment hereof, wherein a push pull actuator is disposed within the actuator amplification apparatus and the actuator amplification apparatus includes an integral amplification mechanism that amplifies a force output by the push pull actuator, the integral amplification mechanism including a plurality of linkages.
Figure 2:
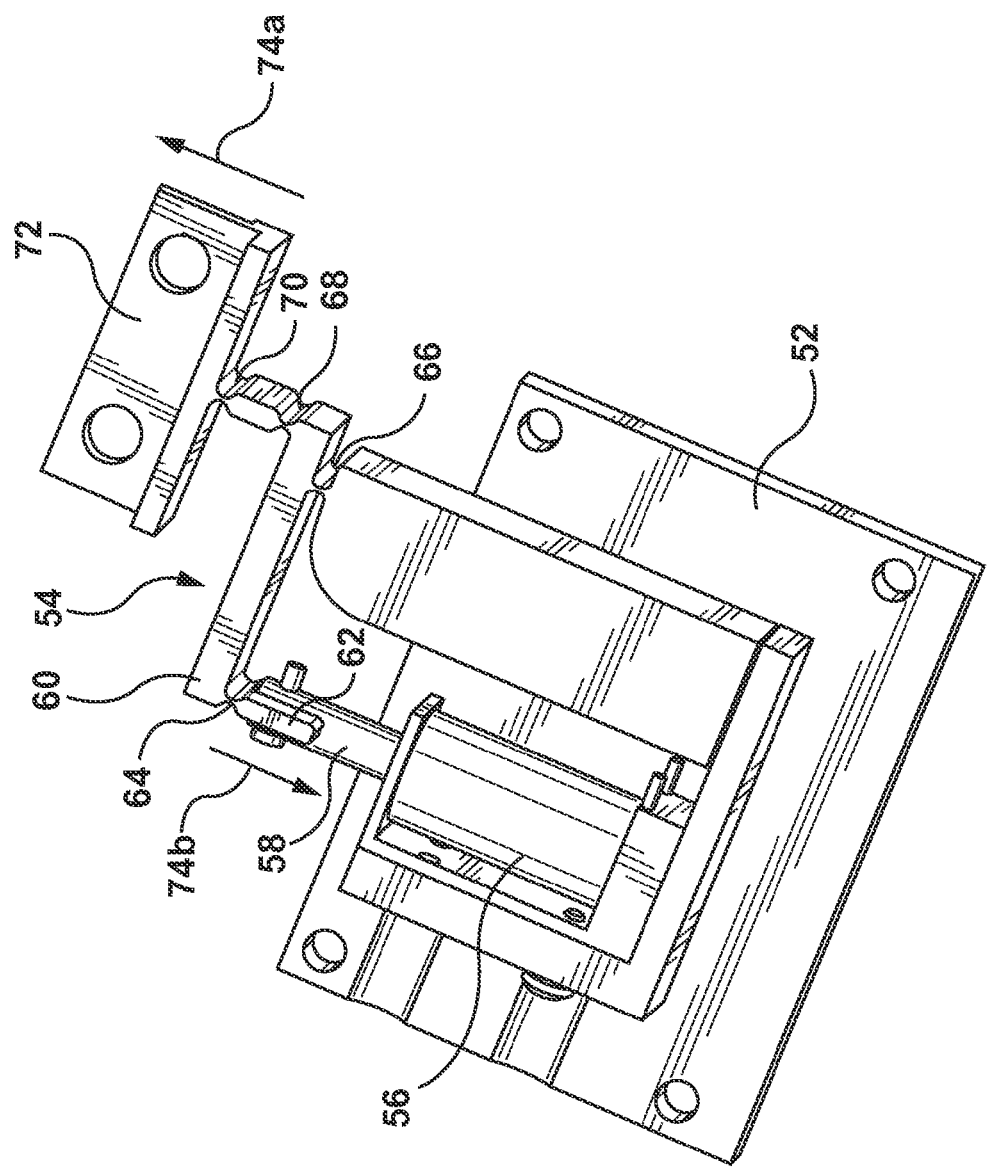
FIG. 2 is a perspective view of an actuator amplification apparatus according to another embodiment hereof, wherein a push pull actuator is disposed on the actuator amplification apparatus and the actuator amplification apparatus includes an integral amplification mechanism that amplifies a force output by the push pull actuator, the integral amplification mechanism including a lever arm.
Figure 3:
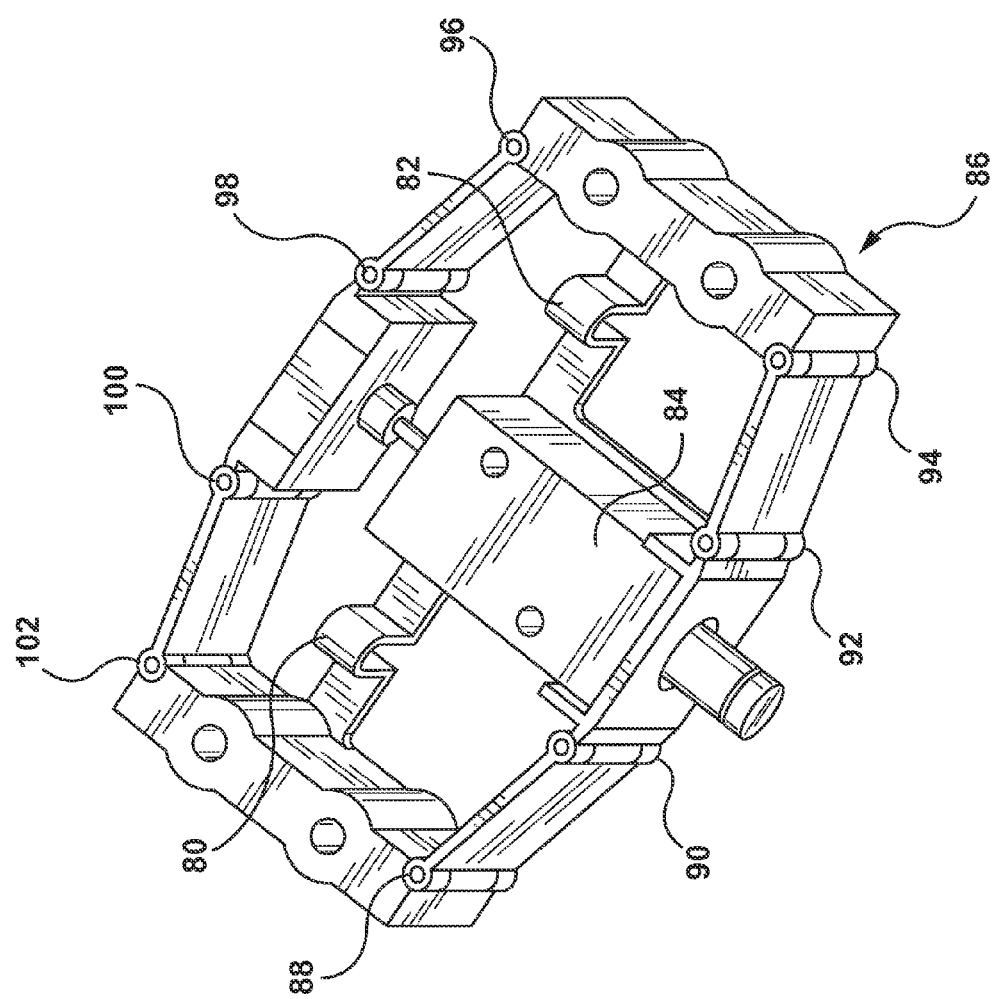
FIG. 3 is a perspective view of an actuator amplification apparatus according to an embodiment hereof, wherein a push pull actuator is disposed within the actuator amplification apparatus and the actuator amplification apparatus includes stabilizers configured to limit movement of the push pull actuator.

The present invention is directed to linked lever mechanisms that take the high travel/low force of a standard push pull solenoid actuator and converts it to low travel/high force through the use of an inexpensive injection molded amplification or lever system. The linked lever can be designed for individual force requirements or for any standard push pull solenoid actuator. Three embodiments will be discussed below and are shown in FIGS. 1, 2 and 3. These embodiments were designed for a heavy floating touch screen assembly that weighs approximately 500 g but may be configured for a moving mass that weighs between 200 grams and 2000 grams. The solenoid actuators considered in the embodiments have an output force in the range of 1-5 Newtons. Stated another way, the force output by the push pull actuator is between 1 N and 5 N.

Embodiments of actuator amplification apparatuses illustrated herein are described within the context of a touch screen wherein a graphical display is disposed behind a touch surface or touch element. It will be understood, however, that the invention is not limited to actuator amplification apparatuses for such touch screens but is equally applicable to any haptically excited touch surface or touch element. For example, the actuator amplification apparatus might be applied to the touch pad of a computer wherein the display screen is not co-located with the touch pad. It may be applied to a touch element with at least one touch sensitive region or an array of touch sensitive regions that may be created by capacitive sensors, near field effect sensors, piezo sensors, or other sensor technology. The graphical element may be a display located behind or in a separate location from the touch element and updated by a host computer, or it may simply be a plastic surface with features (e.g. graphics) indicating touch sensitive regions of an associated touch element. Thus, the term touch screen when used in the following detailed description and in the claims should be construed to encompass traditional touch screens as well as any touch surface or touch element and associated graphical element to which haptic effects may be applied.

In one embodiment, the integral amplification mechanism includes a frame having two pairs of opposing linkages. More particularly, with reference to FIG. 1, an actuator amplification apparatus includes an integral amplification mechanism of an amplification frame 10 which surrounds a push pull solenoid actuator 12. Frame 10 includes a surface or body fixture 14 which is configured to be attached or connected with fixed masses, such as the dashboard frame of the automobile. Frame 10 also includes an output interface 16 which is configured to be attached or connected with a moving mass or suspended panel assembly of the touch screen system as explained in more detail herein with respect to FIG. 4.

A solenoid or push pull actuator 12 is mounted between body fixture 14 and output interface 16. Push pull actuator 12 includes a plunger 18 and an actuator body 22. Actuator plunger 18 is mounted to a frame surface 20 of frame 10 and actuator body 22 is mounted with or disposed within an actuator receiving sleeve 24 of frame 10. Frame surface 20 and actuator receiving sleeve 24 oppose each other.

Two frame linkages, 26 and 28, extend between push pull actuator 12 and fixed mass surface 14. Frame linkages 26 and 28 may be considered a first pair of opposing linkages that extend between push pull actuator 12 and body fixture 14 (which is configured to attach frame 10 to a fixed mass). Frame linkages 30 and 32 extend between actuator 10 and output interface 16. Frame linkages 30 and 32 may be considered a second pair of opposing linkages that extend between push pull actuator 12 and output interface 16 (which is configured to attach frame 10 to a moving mass).

Living hinges 34, 36, 38, 40, 42, 44, 46 and 48 are arranged on each end of frame linkages 26, 28, 30 and 32, respectively. Stated another way, each linkage of the first pair of opposing linkages, i.e., frame linkages 26 and 28, is attached to push pull actuator 12 and body fixture 14 by a pair of flexible joints and each linkage of the second pair of opposing linkages, i.e., frame linkages 30 and 32, is attached to push pull actuator 12 and output interface 16 by a pair of flexible joints. In this embodiment, each flexible joint is a living hinge but each flexible joint may have other configurations that are configured to transmit torque output by push pull actuator 12 through frame 10. Stated another way, push pull actuator 12 is configured to output a force and each flexible joint of frame 10 is configured to transmit force or torque output by the push pull actuator through the frame.

More particularly, when actuator 12 pulls or pushes, flexible joints or living hinges 34, 36, 38, 40, 42, 44, 46 and 48 cause one of the dimensions (height) of frame 10 to contract or expand. This in turn will cause the perpendicular dimension (width) of frame 10 to contract or expand in a designed ratio to the initial solenoid movement. Stated another way, a height of frame 10 expands and a width of frame 10 contracts when plunger 18 of actuator 12 pulls into body 22 of actuator 12. As a result, the plurality of linkages 26, 28, 30, 32 of frame 10 amplifies the force output by push pull actuator 12 to the moving mass. This ratio or mechanical advantage of frame 10 can be from 2:1 to 5:1 as desired. The ratio affects force amplification directly. Arrow 50a depicts the direction of the amplified force as applied to the touch screen or moving mass when plunger 18 pulls in the direction as indicated by arrow 50b.

In another embodiment, the integral amplification mechanism includes a lever arm system. More particularly, with reference to FIG. 2, an actuator amplification apparatus includes an actuator mount 52 and an integrated lever arm system 54. Actuator mount 52 is configured to receive a push pull actuator 56 and is configured to be attached or connected with fixed masses in the system, such as an automotive dashboard. In addition, the actuator amplification apparatus includes an output interface 72 configured to be attached or connected to a moving mass. Lever arm system 54 extends between actuator mount 52 and output interface 72.

A push pull actuator 56 is disposed within or on actuator mount 52 and is configured to output a force. Similar to actuator 12, push pull actuator 56 includes a plunger 58 and an actuator body (called out as push pull actuator 56 on FIG. 2). Lever arm system 54 is attached to actuator mount 52 and output interface 72 by a plurality of flexible joints, and each flexible joint of the actuator amplification apparatus is configured to transmit torque output by push pull actuator 56 through the lever arm system. Lever arm system 54 amplifies the force output by push pull actuator 56 to the moving mass.

More particularly, push pull actuator 56 is mounted with its plunger 58 secured to end 60 of lever arm assembly 54 through a plunger mount 62, which is secured to end 60 of lever arm assembly 54 with a living hinge 64. Lever arm assembly 54 is secured to the actuator mount with a living hinge 66. Living hinges 68 and 70 secure the lever arm to output interface 72 (which is connected with the moving mass, i.e., the floating touch screen assembly). In this embodiment, each flexible joint is a living hinge but each flexible joint may have other configurations that are configured to transmit torque output by push pull actuator 12 through frame 10. As a result, lever arm system 54 amplifies the force output by push pull actuator 56 to the moving mass. The amplified force will be applied to the touch screen in the direction shown by arrow 74a when the plunger 58 pulls in the direction shown by arrow 74b. Lever arm system 54 can be designed for force amplification ranges of 2:1 to 5:1 based on the system requirements. Stated another way, this ratio or mechanical advantage of lever arm system 54 can be from 2:1 to 5:1 as desired. The ratio affects force amplification directly.

The linked levers of FIGS. 1 and 2 can be designed for individual force requirements or for any standard push pull solenoid actuator or other suitable actuator. The amplification mechanism can be injection molded. While the frames are preferably injection molded PE, other materials with sufficient flexibility and stiffness such as but not limited to sheet metal, machined metal, plastic, and/or composite materials may be used. Determining the force needed to move the haptic system and the force provided by the desired push pull actuator will assist in determining the optimal amplification ratio needed. Minimizing the form factor for size and maximizing the amplification are factors to be taken into consideration for the design of the amplification mechanism for a high mass actuation system.

A third embodiment is shown in FIG. 3. This embodiment includes first and second solenoid stabilizers 80 and 82. In this embodiment, first stabilizer 80 extends between push pull actuator 12 and body fixture 14 and second stabilizer 82 extends between push pull actuator 12 and output interface 16. Stabilizers 80 and 82 are configured to stabilize the solenoid body 84 and to limit movement of push pull actuator 12. In other words, they act as a spring or damper and act to prevent out of plane movement by the actuator. The solenoid stabilizers 80 and 82 also reduce the audible noise of the actuator as it keeps the actuator aligned within the frame. The resulting flexure based system of frame 86 and solenoid 84 with its integrated stabilizers 80 and 82 provides for greater force generation and reduced audible noise. Depending upon the size and strength of the actuator 84 mounted in the frame 86, the shape and configuration of solenoid stabilizers 80 and 82 can be determined by one of skill in the art. Ideally frame 84, like the frames of FIGS. 1 and 2, is an injection molded integral PE frame, although other materials with sufficient flexibility and stiffness may be used. Determining the force needed to move the haptic system and the force provided by the desired push pull actuator will assist in determining the optimal amplification ratio needed. Minimizing the form factor for size and maximizing the amplification are factors to be taken into consideration for the design of the amplification mechanism for a high mass actuation system.

FIG. 3 also discloses the use of pin joints 88, 90, 92, 94, 96, 98, 100 and 102. Such joints of the frame 86 are designed to be sufficiently moveable or flexible to transmit the required torque of the actuator 84 through the frame 86. Any other flexible joint, including but not limited to living hinges as shown in the embodiments of FIGS. 1 and 2, may be used provided it is able to transmit the required torque through the frame. Conversely, pin joints may be utilized in the embodiments of FIGS. 1 and 2 to transmit the required torque through the actuator amplification apparatus to the moving mass attached thereto.

Figure 4:
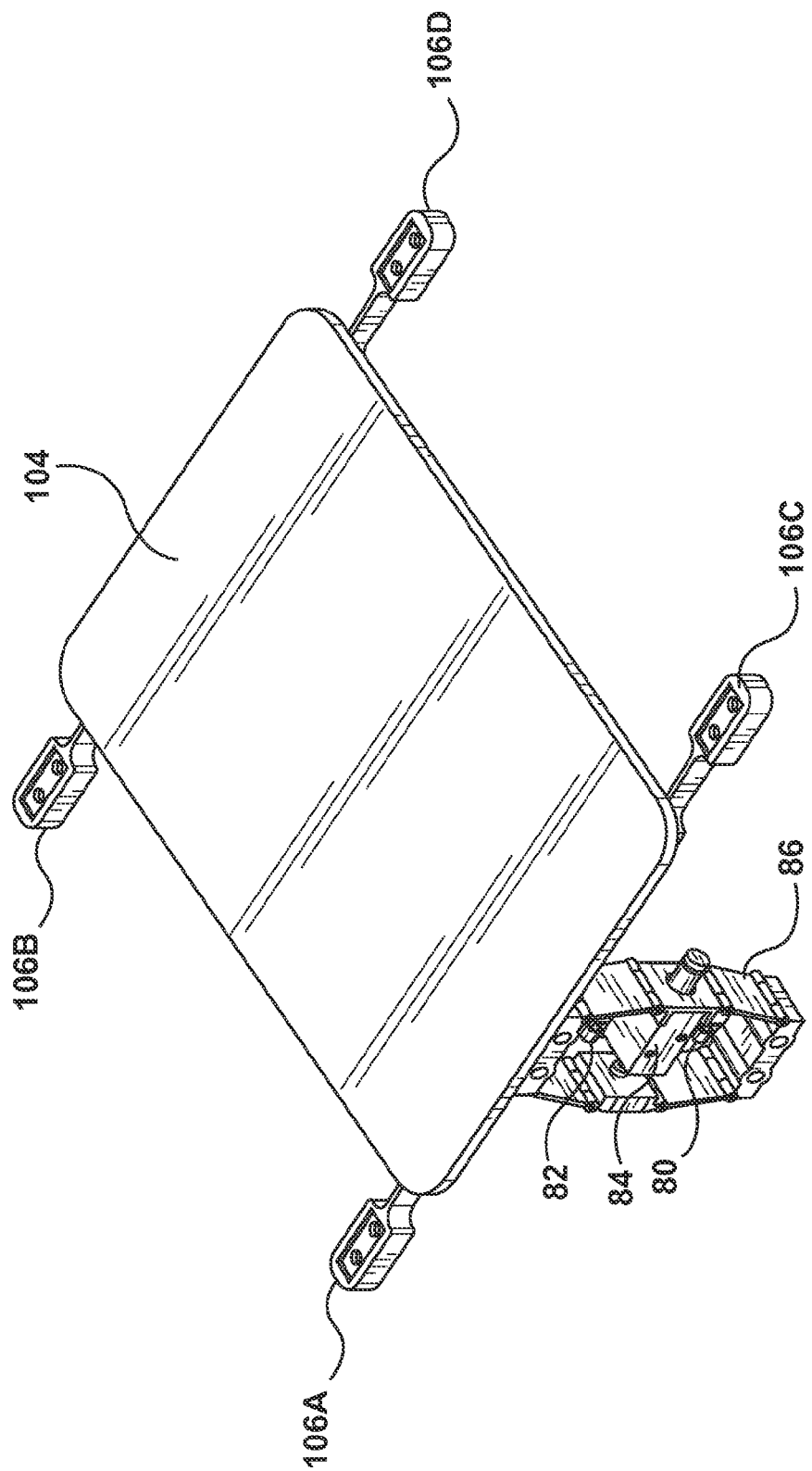
FIG. 4 is a perspective view of an actuator amplification apparatus and a floating or moving mass according to an embodiment hereof, wherein a push pull actuator is disposed within the actuator amplification apparatus and the actuator amplification apparatus is configured to attach to the moving mass.

As previously stated, embodiments hereof are configured to be attached or connected with a moving mass or suspended panel assembly of the touch screen system. FIG. 4 illustrates the actuator amplification apparatus of FIG. 3 and a suspended floating or moving mass. More particularly, the actuator amplification apparatus of FIG. 3 is shown attached or connected to an underside surface of a touch screen 104. Touch screen 104 is attached to a housing (not shown in FIG. 4) via a plurality of suspension elements 106A, 106B, 106C, 106D. Suspension elements 106A, 106B, 106C, 106D are configured to allow movement of touch screen 104 in one direction. More particularly, to allow touch screen 104 to move in response to the force(s) output by the actuator and thereby to isolate a haptic effect to the screen, touch screens may be compliantly suspended within electronic devices in which they reside. Suspension elements 106A, 106B, 106C, 106D shown in FIG. 4 are exemplary and it will be apparent to one of ordinary skill in the art that actuator amplification mechanisms described herein may be utilized with touch screens having any type of suspension system that provide the required compliance for haptic feedback and allow the touch screen to be moved by the forces output by the actuator.

Several embodiments are specifically illustrated and/or described herein. However, it will be appreciated that modifications and variations of the disclosed embodiments are covered by the above teachings and within the purview of the appended claims without depending from the spirit and intended scope of the invention. While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A system comprising:
    a push pull actuator configured to output a force in a first direction and output an amount of travel in the first direction; and
    an actuator amplification apparatus configured to receive the push pull actuator, the actuator amplification apparatus including a body fixture configured to attach the actuator amplification apparatus to a fixed mass, an output interface to attach the actuator amplification apparatus to a moving mass, and an integral amplification mechanism,
    wherein the push pull actuator is disposed on or within the actuator amplification apparatus, and wherein the integral amplification mechanism of the actuator amplification apparatus is configured to convert the force and the amount of travel output by the push pull actuator in the first direction to an amplified force on the moving mass and a second and lower amount of travel for the moving mass in a second direction.

2. The system of claim 1, wherein the force output by the push pull actuator is between 1 N and 5 N and the actuator amplification apparatus amplifies the force by a ratio between 2:1 and 5:1.

3. The system of claim 1, wherein the integral amplification mechanism extends from the body fixture to the output interface along the second direction, the second direction being perpendicular to the first direction.

4. The system of claim 1, wherein the integral amplification mechanism includes a frame having a first pair of opposing linkages extending between the push pull actuator and the body fixture and a second pair of opposing linkages extending between the push pull actuator and the output interface.

5. The system of claim 4, wherein each linkage of the first pair of opposing linkages is attached to the push pull actuator and the body fixture by a pair of flexible joints and each linkage of the second pair of opposing linkages is attached to the push pull actuator and the output interface by a pair of flexible joints, each flexible joint being configured to transmit torque output by the push pull actuator through the frame.

6. The system of claim 5, wherein each flexible joint is a living hinge.

7. The system of claim 5, wherein each flexible joint is a pin joint.

8. The system of claim 5, wherein a plunger of the push pull actuator is mounted to a frame surface of the frame and a body of the push pull actuator is disposed within an actuator receiving sleeve of the frame, the frame surface and the actuator receiving sleeve opposing each other.

9. The system of claim 8, wherein a height of the frame expands and a width of the frame contracts when the plunger pulls into the body of the push pull actuator.

10. The system of claim 5, wherein the frame further includes a first stabilizer extending between the push pull actuator and the body fixture and a second stabilizer extending between the push pull actuator and the output interface, the first and second stabilizers being configured to limit movement of the push pull actuator.

11. The system of claim 1, wherein the actuator amplification apparatus is injection molded.

12. The system of claim 1, wherein the actuator amplification apparatus is formed from at least one of sheet metal, machined metal, plastic, and a composite material.

13. The system of claim 1, wherein the moving mass weighs between 200 grams and 2000 grams.

14. The system of claim 13, wherein the moving mass is a floating haptic touch screen assembly.

15. The system of claim 13, wherein the fixed mass is a dashboard frame of an automobile.

16. A system comprising:
a push pull actuator; and
an amplification frame including
   a body fixture configured to connect the amplification frame to a fixed mass,
   an output interface to connect the amplification frame to a haptic touch screen,
   an actuator receiving sleeve configured to receive the push pull actuator, and
   a plurality of linkages including a first pair of opposing linkages extending between an actuator mount and the body fixture, and a second pair of opposing linkages extending between the actuator mount and the output interface, wherein each linkage of the first pair of opposing linkages is attached to the actuator mount and the body fixture by a pair of flexible joints, and each linkage of the second pair of opposing linkages is attached to the actuator mount and the output interface by a pair of flexible joints,
wherein the push pull actuator is disposed within the actuator receiving sleeve and configured to output a force, wherein each flexible joint of the amplification frame is configured to transmit torque output by the push pull actuator through the amplification frame, and the plurality of linkages of the amplification frame amplifies the force output by the push pull actuator to the haptic touch screen.

17. The system of claim 16, wherein a plunger of the push pull actuator is mounted to a frame surface of the amplification frame and a body of the push pull actuator is disposed within the actuator receiving sleeve of the amplification frame, the frame surface and the actuator receiving sleeve opposing each other and wherein a height of the amplification frame expands and a width of the amplification frame contracts when the plunger pulls into the body of the push pull actuator.

18. The system of claim 16, wherein the amplification frame further includes a first stabilizer extending between the push pull actuator and the body fixture and a second stabilizer extending between the push pull actuator and the output interface, the first and second stabilizers being configured to limit movement of the push pull actuator.

19. A system comprising:
a haptic touch screen;
an actuator amplification apparatus including
   an actuator mount configured to receive a push pull actuator and configured to attach the actuator amplification apparatus to a fixed mass,
   an output interface to attach the actuator amplification apparatus to the haptic touch screen, and
   a lever arm system extending between the actuator mount and the output interface, wherein the lever arm system is attached to the actuator mount and the output interface by a plurality of flexible joints; and
a push pull actuator disposed within the actuator mount and configured to output a force, wherein each flexible joint of the actuator amplification apparatus is configured to transmit torque output by the push pull actuator through the lever arm system, and the lever arm system is configured to amplify the force output by the push pull actuator to the haptic touch screen.

20. The system of claim 19, wherein a plunger of the push pull actuator is mounted to an end of the lever arm system and a body of the push pull actuator is disposed within the actuator mount.

* * * * *